United States Patent [19]

Sueda et al.

[11] Patent Number: 4,698,511
[45] Date of Patent: Oct. 6, 1987

[54] DOCUMENT SHEET SIZE OR POSITION RECOGNITION DEVICE

[75] Inventors: Tetsuo Sueda, Chofu; Toshinori Ando, Yokohama, both of Japan

[73] Assignee: Canon Kabushiki Kaisha, Tokyo, Japan

[21] Appl. No.: 794,382

[22] Filed: Nov. 4, 1985

[30] Foreign Application Priority Data

Nov. 8, 1984 [JP] Japan ............................. 59-235455
Dec. 28, 1984 [JP] Japan ............................. 59-276477

[51] Int. Cl.⁴ .............................................. G01N 21/86
[52] U.S. Cl. ................................... 250/560; 250/561; 356/375
[58] Field of Search ............. 250/560, 561; 355/35 H, 355/14 R, 14 SH; 356/384–386, 375

[56] References Cited

U.S. PATENT DOCUMENTS

| | | | |
|---|---|---|---|
| 2,791,931 | 5/1957 | Summerhayes, Jr. | 356/386 |
| 4,439,790 | 3/1984 | Yoshida | 358/257 |
| 4,505,574 | 3/1985 | Kurata et al. | 250/560 X |
| 4,554,592 | 11/1985 | Yoshida | 358/257 |
| 4,572,650 | 2/1986 | Okuda | 250/560 X |

FOREIGN PATENT DOCUMENTS

0000605 1/1984 Japan ................................. 356/384

Primary Examiner—Eugene R. Laroche
Assistant Examiner—David Mis
Attorney, Agent, or Firm—Fitzpatrick, Cella, Harper & Scinto

[57] ABSTRACT

In a document sheet recognition device, a size or position of a document sheet mounted on a document table is detected by detecting light intensities at a plurality of fixed areas on the document sheet table, and the size or position thereof is determined in accordance with the detected light intensities.

12 Claims, 17 Drawing Figures

DOCUMENT SHEET SIZE OR POSITION RECOGNITION DEVICE

BACKGROUND OF THE INVENTION

1. Field of the Invention

The present invention relates to a document sheet recognition device for recognizing position and size of a document sheet in a copying machine or the like.

2. Description of the Prior Art

In office equipment which handles document sheets, such as an electrophotographic machine or a facsimile machine, a variable magnification optical system is often mounted to provide variable magnification as one of the machine's functions. When the variable magnification optical system is used in the electrophotographic machine, a magnification may be selected in accordance with a size of an original document so that an image of the original document is exactly copied onto a copy sheet of a given size. In order to precisely carry out this operation, an apparatus to recognize the size of the original document and, in some cases, the position thereof, is required. In an apparatus having means to recognize the size or position of the original sheet, it is possible to first recognize the size and position of the document sheet and then select a copy sheet which fits the size of the original document sheet.

Figure 1:
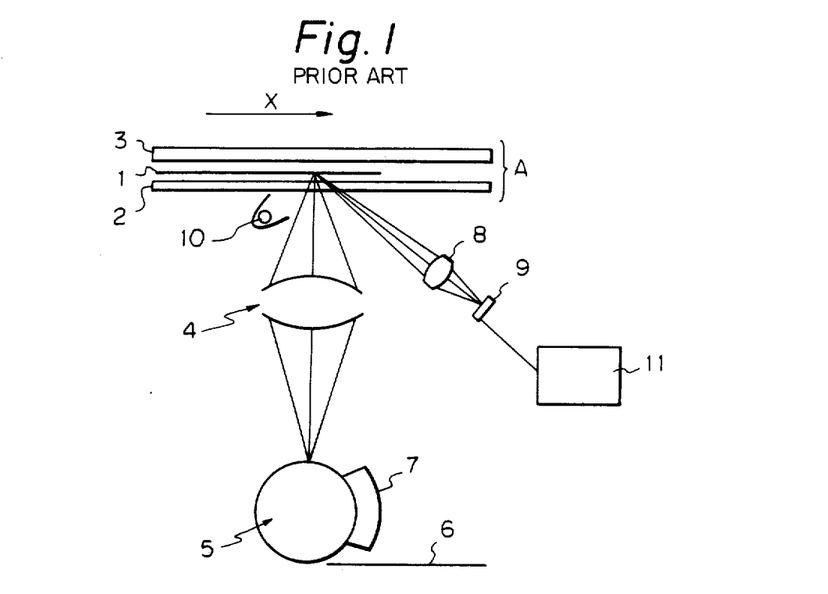
FIG. 1 shows a copying machine having a prior art document sheet recognition device.

A prior art apparatus of this type is constructed as shown in FIG. 1. A unit A which comprises a document sheet 1, a press plate 3 and a document sheet glass 2 is moved in an x-direction relative to other members. The movement of the unit A may be effected by mechanical movement of the unit itself or by mechanical movement of a reflection mirror system which directs light to a focusing lens 4 (stationary document sheet system). Other members include document sheet illumination optical system 10, focusing optical system 4, photoacceptor 5 such as photo-conductive drum, developing unit 7 for electrophotographic processing, optical system 8 for recognizing position and size of the document sheet, linear photo-diode array 9 and driver 11. A surface of the press plate 3 is a mirror surface. Light irradiated from the light source 10 to the press plate 3 is prevented from impinging on the focusing optical system 4 or the optical system 8 for recognizing the position and size of the document sheet. Only diffused light flux from the surface of the document sheet is directed to those optical systems.

Figure 2:
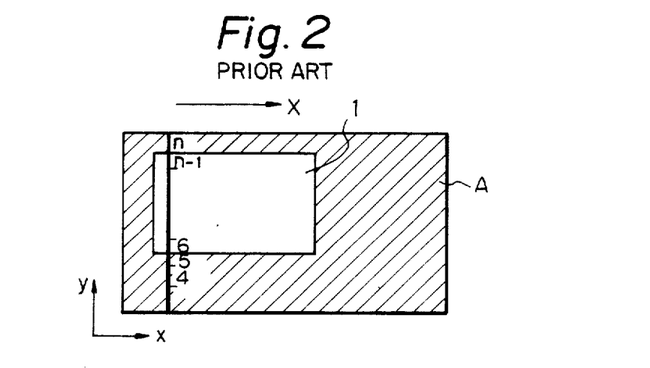
FIG. 2 shows a relationship among document sheet table, document sheet and photo-diode array.

The document sheet position and size recognition means can recognize the area of the document sheet 50 shown in FIG. 2 as the unit A moves. A hatched area shows an area of the unit A in which the document sheet is not present.

Figure 3:
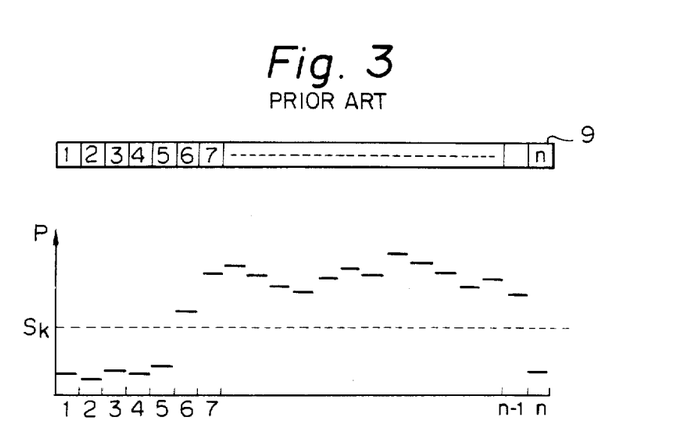
FIG. 3 shows outputs of diodes of a photo-diode array in a document sheet recognition mode.

The photo-diode array 9 can detect a light intensity distribution in a y-direction of the unit A. FIG. 3 shows the distribution. When an output P of the photo-diode array exceeds a threshold $S_K$, it is recognized that the document sheet is present in an area of the unit A which corresponds to the address at which the threshold for the photo-diode array 9 was exceeded. In FIG. 3, the document sheet exists in the area between the addresses 6 and (n-1), inclusive. This step is sequentially repeated as the unit A is moved in the x-direction so that the area of the document sheet in the unit A is detected.

The size and position of the document sheet can be detected in this manner. However, the prior art method requires formation of focusing light flux from the document sheet to the focusing optical system 4 as well as focusing light flux from the document sheet to the photo-diode array 9. Since signals at all addresses of the photo-diode array 9 should be evenly processed, the required technique is complex. High speed signal processing is required in order to detect the presence of the document sheet for each address in the y-direction while effecting the x-direction movement. Since the spatial resolution is determined by the total number of addresses of the photo-diode array, a photo-diode array having a number of addresses is required to achieve a high resolution. When such means is used, the signal processing speed should be further increased. When the light source 10 is energized by an A.C. voltage such as a fluorescent lamp, illumination light intensity varies in time and detection precision is lowered.

SUMMARY OF THE INVENTION

The object of the present invention is to provide an apparatus for determining the size and/or position of a document sheet without the disadvantages described above.

The present invention eliminates the disadvantages encountered in the prior art apparatus and recognizes size or position of a document sheet at a high precision by a fast and simple signal processing method.

It detects light intensities in a plurality of fixed areas on a document sheet table and detects the size and position of the document sheet by the light intensities in the plurality of areas.

When it is determined that the document sheet exists in all of adjacent areas of the plurality of areas, the length of the adjacent areas is preferably set as a reference length, so that light intensity detected for an area under consideration can be corrected by a light intensity detected for the adjacent area and the reference length, so that the correct size and position of the document sheet can be detected more precisely.

According to one embodiment, light intensities of a diffusion reflection light from the document sheet are detected for a predetermined section on the document sheet by photodetectors arranged at two or more points, a length of the document sheet is detected based on a sum of the detected light intensities, a center coordinate is detected based on a difference of the detected light intensities, and end positions of the document sheet are detected based on those two recognition results.

By detecting the diffusion reflection light from the surface of the document sheet by a plurality of sensors and detecting a light intensity balance therebetween, the position and size of the document sheet on the document sheet table can be precisely recognized at a high speed.

The foregoing and other objects, features and advantages of the invention will be more fully appreciated from a consideration of the following detailed description of the preferred embodiments, taken in conjunction with the accompanying drawings, in which like reference characters denote like elements throughout.

DESCRIPTION OF THE PREFERRED EMBODIMENTS

Embodiment 1

Figure 4:
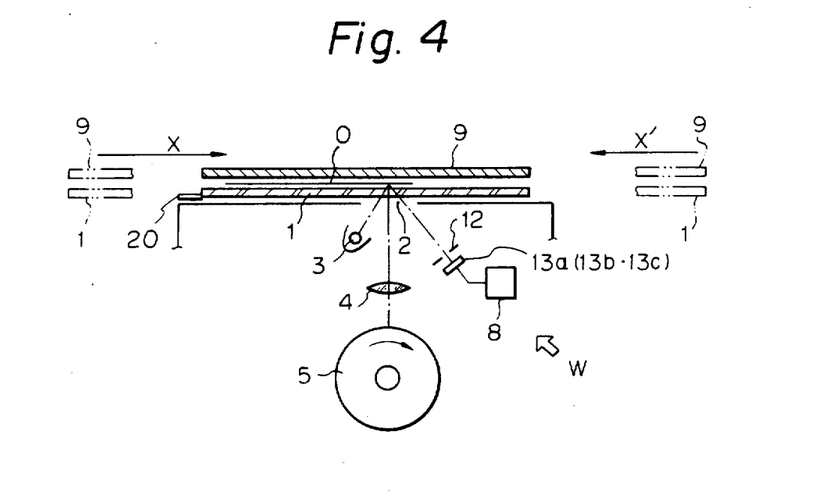
FIG. 4 shows an embodiment of a reciprocal document sheet table type electrophotographic apparatus having a document sheet recognition device according to the present invention.
Figure 5:
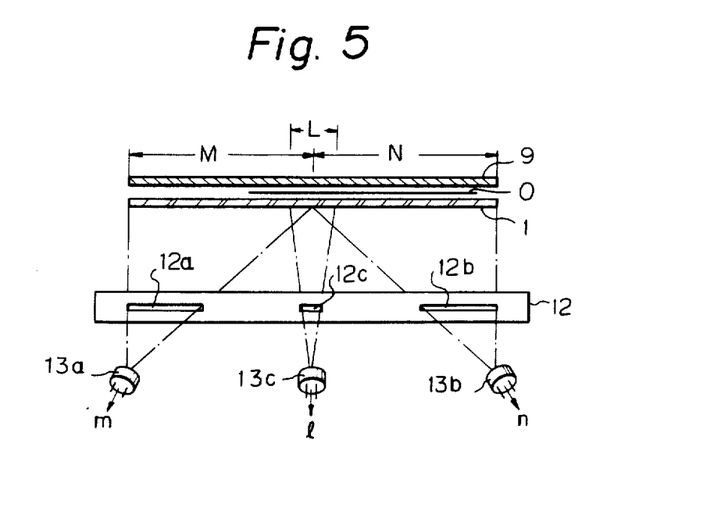
FIG. 5 is a rear view of the document sheet recognition device of FIG. 4.

FIG. 4 shows a reciprocal document sheet table type electrophotographic apparatus having a document sheet recognition device according to the present invention. FIG. 5 shows the document sheet recognition device of FIG. 4 as viewed in a direction W indicated in FIG. 4. Numerals 13a, 13b and 13c denote first to third photo-detectors which sense diffusion reflection light reflected from a document sheet from a slit illumination unit 12. They are arranged at positions corresponding to the longitudinal opposite ends and the center of the slit illumination unit 12.

The slit illumination unit 12 is a slit array arranged in front of the photo-detectors 13a, 13b and 13c and has first to third slits 12a, 12b and 12c formed longitudinally to correspond to the three photo-detectors. The slits need not be formed in array, but instead three pairs of photo-detectors and slits can be separately arranged.

The first photo-detector 13a, the second photo-detector 13b and the third photo-detector 13c sense diffusion reflection light reflected from sections M, N and L the document sheet, respectively, of the longitudinal area of the slit illumination unit 12 through the first slit 12a, the second slit 12b and the third slit 12c, respectively.

The lower surface of the document sheet press plate 9 is a mirror surface as is in the apparatus of FIG. 1, and the illumination light reflected by the lower surface of the document sheet press plate is prevented from impinging on the photo-detectors 13a, 13b and 13c.

Figure 6:
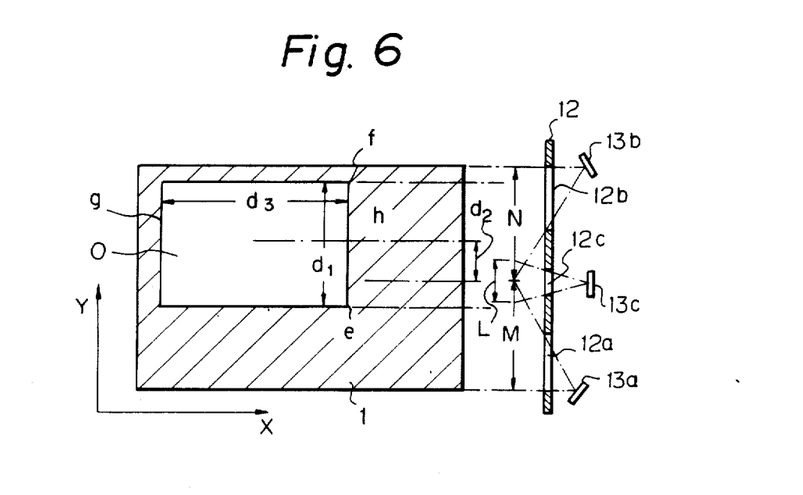
FIG. 6 shows a relationship between document sheet table, document sheet and photo-detector in the embodiment of FIG. 4.

In FIGS. 5 and 6, when a document sheet 0 having a width which is larger than one half of that Y of the document sheet table 1 (length of the slit illumination unit 12) is mounted on the document sheet table 1 and the latter is moved in the x-direction, the first to third photo-detectors 13a to 13c produce outputs m, n and l corresponding to diffusion reflection light intensities from the sections M, N and L as the document sheet on the document sheet table 1 passes through the slit illumination unit 12. The outputs are supplied to a calculation circuit shown in FIG. 7, in which m and n are recognition signals for recognizing the y-direction length or width of the document sheet 0 and the widthwise position of the document sheet on the document sheet table, and l is a correction signal for correcting a background density of the document sheet 0.

The y-direction length of the document sheet 0 (width of the document sheet) $d_1$ can be recognized, or determined by signal processing of $(m+n)/l$. A difference $d_2$ between the y-direction center position of the document sheet table 1 and the center position of the document sheet 0 can be recognized by signal processing of $(n-m)/l$. The y-direction opposite end positions e and f of the document sheet 0 can be recognized by signal processing of $e = d_2 - d_1/2$ and $f = d_2 + d_1/2$.

The above process is sequentially repeated as the document sheet table 1 is moved in the x-direction so that the x-direction length and position of the document sheet 0 can be recognized. The front and rear end positions g and h of the document sheet 0 can be recognized by setting a threshold to rising and falling signals of the values l. Thus, the length $d_3$ of the document sheet 0 and the x-direction position thereof on the document sheet table 1 can be recognized.

In the present embodiment, three photo-detectors are used. When more than three photo-detectors are used, a recognition range of the size and position of the document sheet 0 can be expanded.

In an actual document on which characters are written, l, m and n may not be considered as reflections from a uniform density. In this case, a maximum value of $d_1$ obtained as the document sheet table 1 is moved in the x-direction is used as e and f. The above signal errors may be reduced when infrared ray detectors are used as the photo-detectors 13a–13c.

Figure 7:
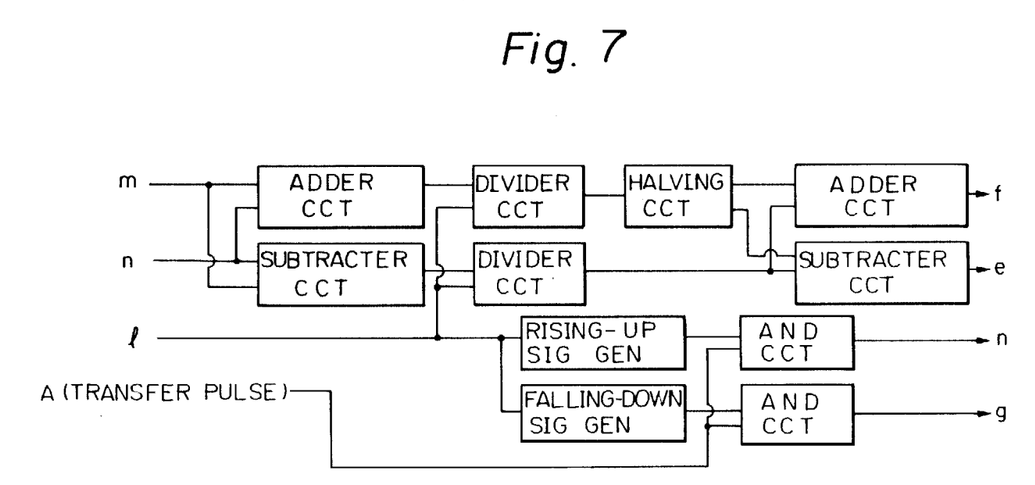
FIG. 7 is a block diagram of a calculation circuit used in that embodiment.

FIG. 7 is a block diagram of the signal processing circuit. When the document density is uniform, the signal l is not necessary.

Embodiment 2

Figure 8:
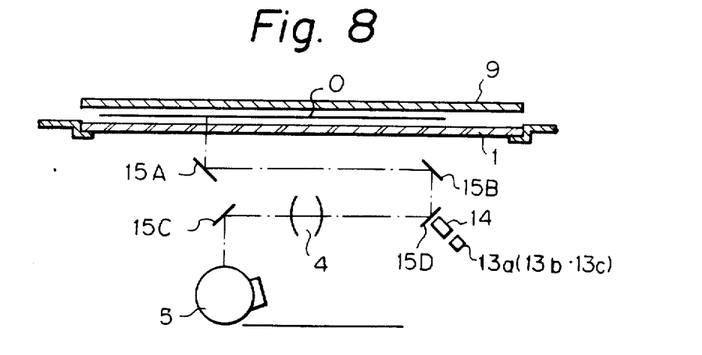
FIG. 8 shows an embodiment of a stationary document sheet table type electrophotographic apparatus having the document sheet recognition device of the present invention.
Figure 9:
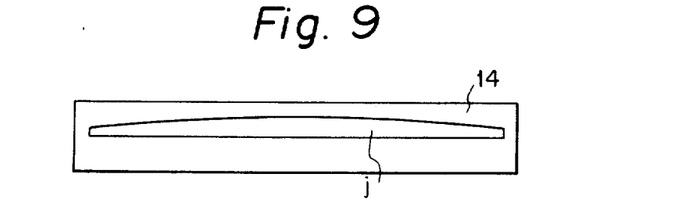
FIG. 9 is a plan view of a mirror having a slit.

This embodiment is a stationary document sheet table type electrophotographic apparatus, in which reflection mirrors 15A–15D (FIG. 8) are incorporated. (Numeral 15A denotes a movable mirror moving at a velocity V, numerals 15B and 15D denote movable mirrors moving at a velocity V/2, and numeral 15C denotes a fixed mirror.) One of the mirrors, for example, the mirror 15D, has a slit j (FIG. 9) and a mask 14 is provided to correct a $\cos^4$ distribution of a light beam directed to the photo-acceptor 5, and has a slit j for that purpose. The density of the document sheet may be detected by the signals m and n to effect automatic exposure control.

In accordance with the present embodiment, the recognition of the document sheet, that is, the size and position of the document sheet on the document sheet table can be precisely detected at a high speed with a simple configuration.

Embodiment 3

Figure 10:
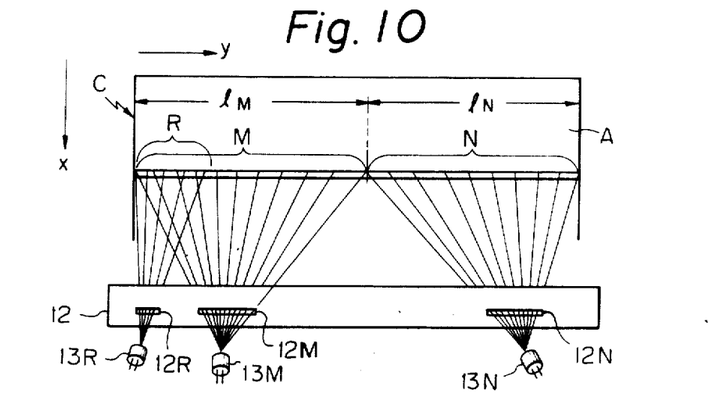
FIGS. 10 and 11 show optical systems in other embodiments of the invention for detecting the document sheet size.

In the embodiment, a plurality of photo-detectors 13 (FIG. 4) are arranged perpendicularly to the plane of the drawing. Numeral 12 denotes a slit array and numeral 20 denotes a standards white plate. FIG. 10 shows a relationship among the photo-detector 12, slit array 13 and the unit A, as viewed in direction W indicated in FIG. 4. Three photo-detectors are used to detect the light intensities on the unit A and the detection ranges are limited by the slit array 12. The photo-detectors 13M, 13N and 13R detect light in the regions M, N and R, respectively of the unit A through the slits 12M, 12N and 12R, respectively. The y-direction lengths of the regions M and N on the unit A are given by $l_M$ and $l_N$, respectively. The region R is an area in which the document sheet is normally mounted. In FIG. 10, the document sheet is mounted along a side C of the unit A. In the present embodiment, three slits are formed in the slit array 12. Alternatively, the slits and the photo-detectors may be paired and the regions R, M and N may be covered by different pairs which are not necessarily in one line. It is assumed that the slits are formed such that the brilliance distribution in A is uniform and the light intensities per unit y-direction length in the regions R, M and N are directed to the respective photo-detectors at a uniform intensity. The standard white plate 20 is a uniform density white plate which effects perfect diffusion.

Means for detecting the size and position of the document by the device described above will now be explained.

Figure 11:
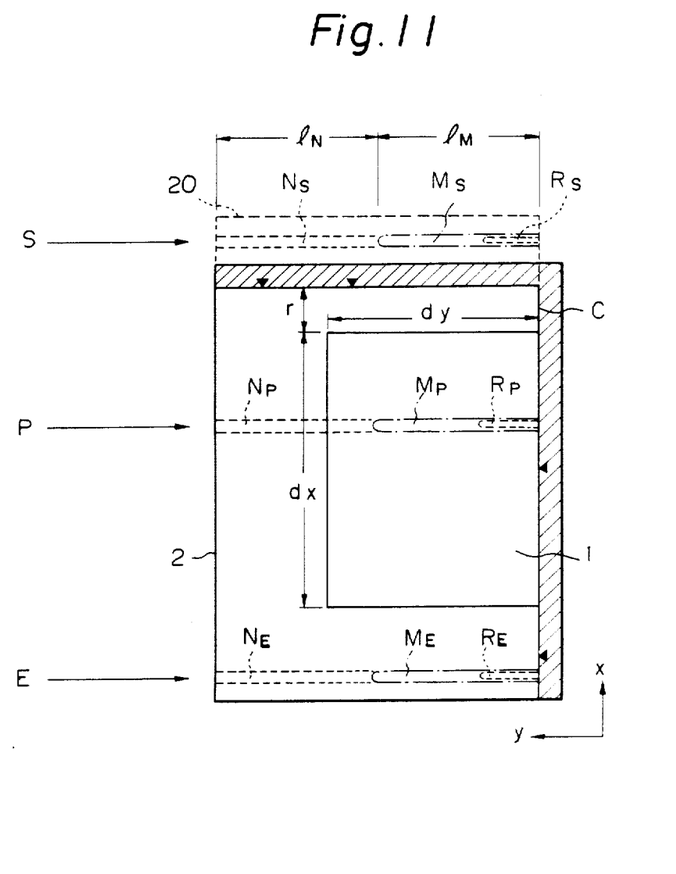

FIG. 11 shows the document sheet 1 mounted on the document sheet table 2. The document sheet 1 is urged to the side C of the document sheet reference position (hatched area). The document sheet has lengths $d_x$ and $d_y$ in the x and y-direction and is spaced from the document sheet reference position by r in the x-direction. This embodiment is an electrophotographic apparatus and the document size and position are detected by scanning the unit A before the electrophotographic process is started.

Detector outputs $N_S$, $M_S$ and $R_S$ for the standard white plate at a scan position S, detector outputs $N_P$, $M_P$ and $R_P$ for the document sheet at a scan position P and detector outputs $N_E$, $M_E$ and $R_E$ for the press plate at a scan position E are processed by a controller 21 which includes a signal processor such as a microcomputer to detect the document sheet length. The signal processing in the controller 21 is explained below.

The data at the position E are used as dark data which are subtracted from the data at the positions P and S. The data at the position S are used as standard correction data on the assumption that the document sheet is arranged along the entire length in the y-direction. The data $R_E$, $N_E$ and $M_E$ at the position E are subtracted from the data $R_S$, $N_S$, $M_S$ at the position S and the data $R_P$, $N_P$ and $M_P$ at the position P.

$$N_S' = N_S - N_E$$

$$M_S' = M_S - M_E$$

$$R_S' = R_S - R_E$$

$$N_P' = N_P - N_E$$

$$M_P' = M_P - M_E$$

$$R_P' = R_P - R_E$$

The data R are reference data for the document sheet density for correcting the data N and M. The results of correction are defined by $$N_S'' = N_S'/R_S'$$

$$M_S'' = M_S'/R_S'$$

$$N_P'' = N_P'/R_P'$$

$$M_P'' = M_P'/R_P'$$

$M_S''$ corresponds to $l_m$ and $N_S''$ corresponds to $l_N$. The document sheet lengths $L_M$ and $L_N$ corresponding to 13M and 13N at the position P are given as follows in accordance with the data $N_P''$, $M_P''$, $N_S''$ and $M_S''$.

$$L_M = l_M \times M_P''/M_S''$$

$$L_N = l_N \times N_P''/N_S''$$

The y-direction length of the document sheet at the position P may be $L_M + L_N$. To attain a higher precision, it is determined whether $L_N$ is significant and $L_M$ is sufficiently close to $l_M$. If they are, $l_M$ is used as $L_M$. $L_N$ is given by $$L_N' = l_M \times L_N/L_M$$

The y-direction length $d_y$ of the document sheet at the position P is given by $$d_y = l_M + L_N'$$

If the above decision is NO, $d_y$ is set to $L_M$. In this manner, the y-direction length of the document sheet at the position P can be detected. In many cases, the document has characters or photographic material described or printed thereon. Where there is a large distribution of the document density, an error may be present in the detected document sheet length. Accordingly, the x-direction position P for detecting the document sheet length is selected from a plurality of positions scanned along the entire length $d_x$ or a portion thereof. As it is scanned, the photo-detector 13R produces an output which varies in accordance with the presence or absence of the document sheet in the x-direction. The data at the position at which $R_P$ and $M_P$ or $R_P$, $M_P$ and $N_P$ are close to their maximum values in the document sheet area and at which the scan position does not significantly change are used to calculate the document sheet length. Namely, the data at the continuous white region in the y-direction on the document sheet are used. Mean values of $R_P$, $M_P$ and $N_P$ at a plurality of positions are calculated and used to calculate the document sheet length.

Figure 12:
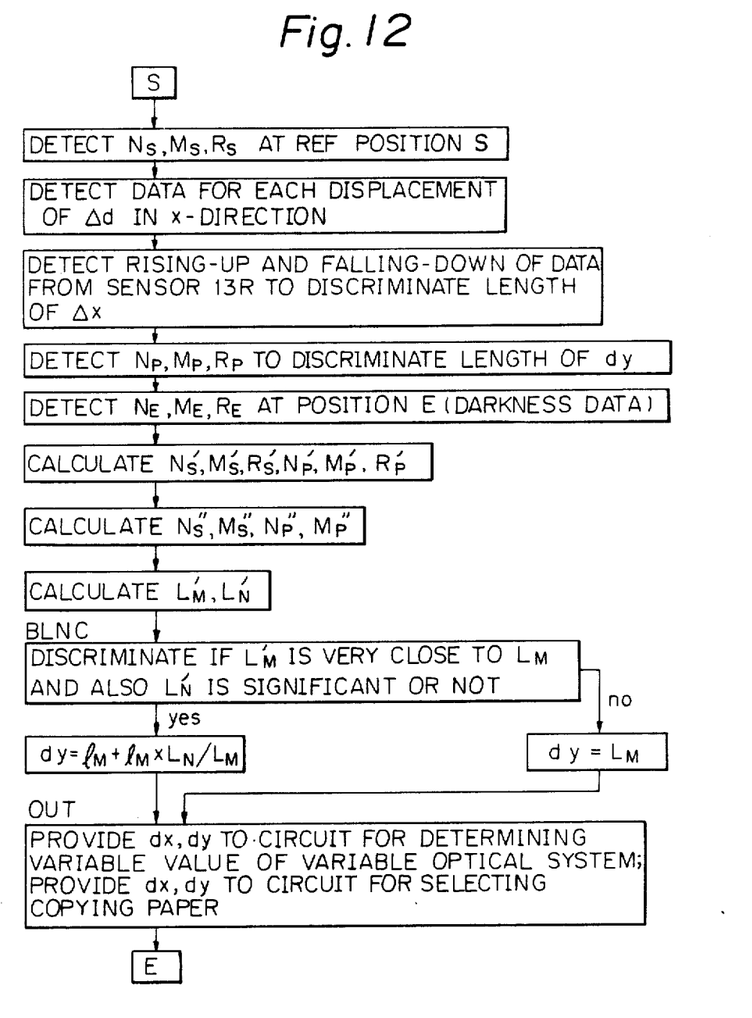
FIG. 12 shows a flow chart of data processing for detecting the document sheet size.

FIG. 12 shows a flow chart of signal processing. In the present embodiment, the variable magnification optical system is controlled or the selection of the copy sheet is done in accordance with the calculated document sheet size $d_x$ and $d_y$.

Figure 13:
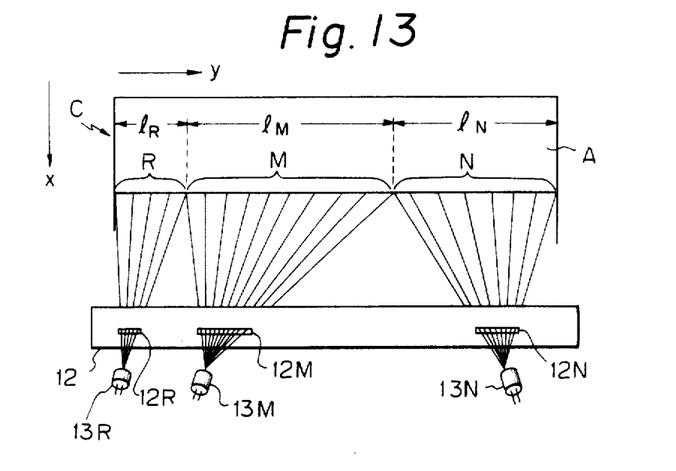
FIGS. 13 and 15 show optical systems in other embodiments of the invention.
Figure 14:
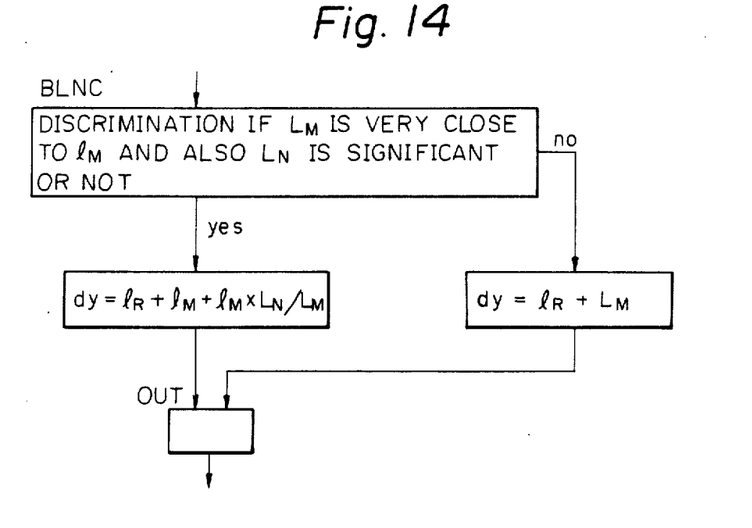
FIGS. 14 and 16 show process flow charts of those embodiments.

FIG. 13 shows an embodiment in which areas R and M covered by photo-detectors 13R and 13M do not overlap each other. The length of the area R is given by $l_R$. In processing the signal, the steps after BLNC in FIG. 12 are changed to steps shown in FIG. 14 while taking the length of the area R into consideration. By handling the length of the area independently, the precision for measuring the document sheet length is further improved.

Figure 15:
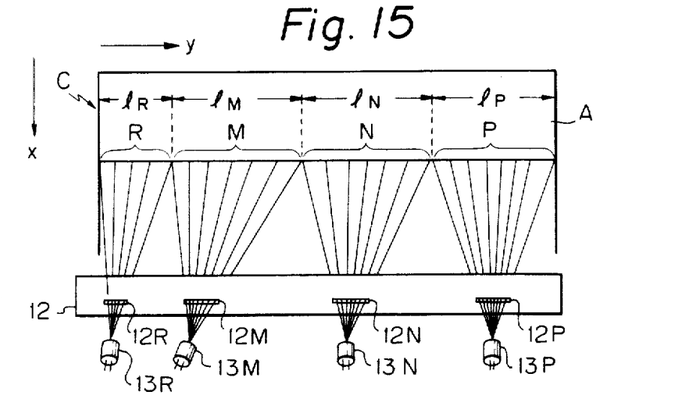

FIG. 15 shows an embodiment which uses four photo-detectors 13. It can detect the document sheet length with a higher resolution.

Figure 16:
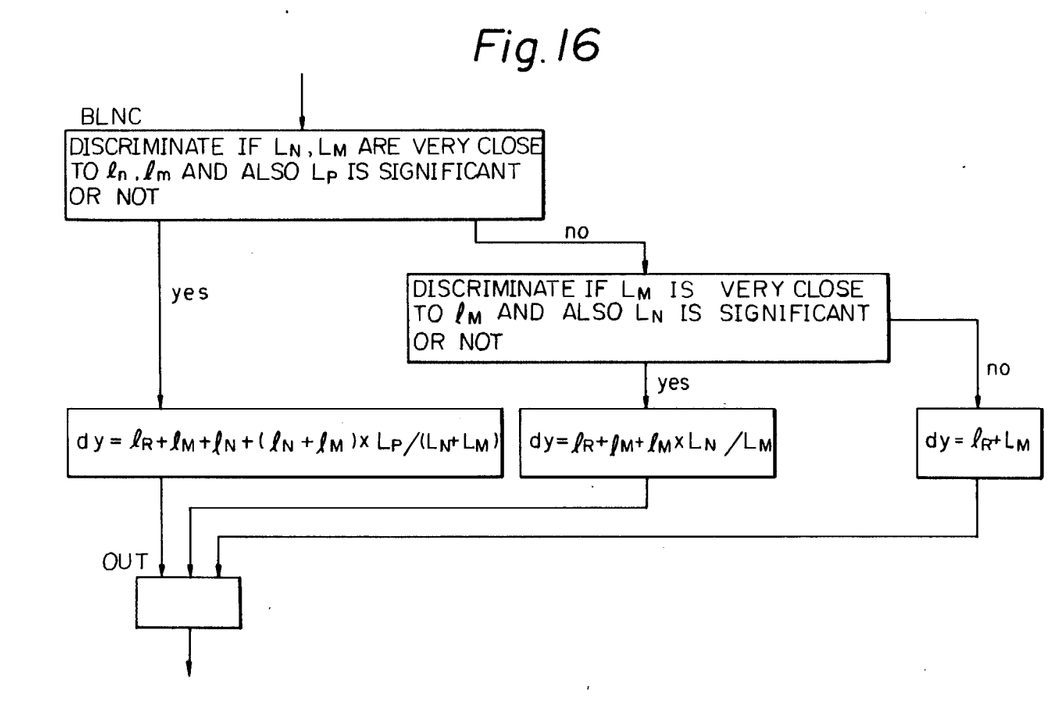

The signal may be processed in a manner shown in FIG. 16.

Figure 17:
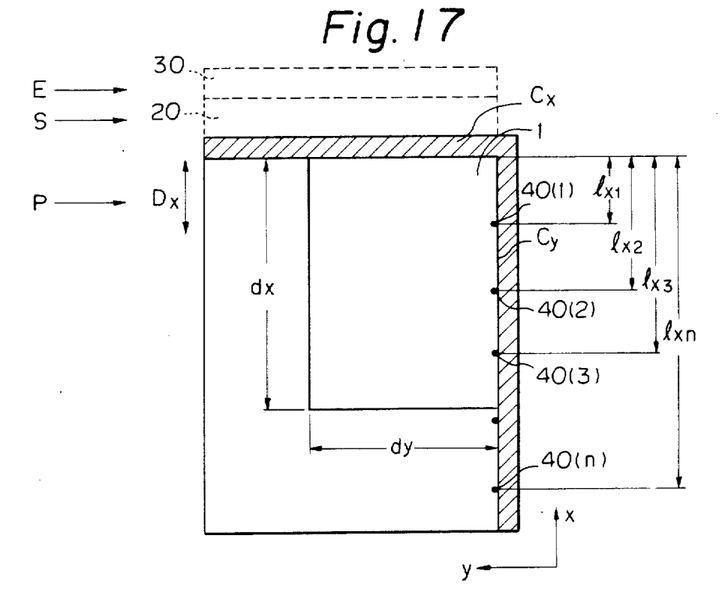
FIG. 17 shows an other embodiment of the invention.

FIG. 17 shows an embodiment in which the entire x-direction range is not scanned, a scan range to detect the y-direction of the document sheet is limited to $D_X$, and photointerrupters 40(1)–40(n) comprising pairs of light sources and photo-detectors are provided at more than one fixed positions $l_{x1}, l_{x2}, \ldots, l_{xn}$ in the x-direction of the document sheet. The size and position are detected depending on which one of the photo-interrupters changes its state. Numeral 30 denotes a standard dark plate for determining a dark data value. The document sheet 1 is mounted on the document sheet table along the document sheet reference positions $C_x$ and $C_y$. The y-direction length $d_y$ of the document sheet can be detected in the same manner as that described above. The x-direction length $d_x$ of the document sheet can be detected based on the position of the photo-interrupters 40. In the present embodiment, the x-direction and y-direction length of the document are independently detected. Thus, the distance $D_x$ may be shorter than the scan area document sheet length to detect the document sheet size and the detection speed is increased.

In the present embodiment, in order to detect the size and position of the document sheet mounted on the document sheet table, the intensity of the reflection light from the document sheet is detected for the limited area, and if it is determined from the result of the detection that the document sheet extends over the entire area of the adjacent area, the adjacent area length is set to a predetermined length and the light intensity detected for the area under consideration is corrected by the light intensity for the adjacent area. Thus, the position and size of the document sheet can be detected with high precision and simple construction.

What we claim is:

1. A document sheet recognition device comprising:
   a document sheet table for mounting a document sheet thereon;
   a light source for illuminating the document sheet mounted on said document sheet table;
   detecting means for detecting an average light quantity of each of fixed areas on said document sheet table; and
   discriminating means for discriminating a size or position of the document sheet mounted on said document sheet table on the basis of merely the average light quantity of each fixed area detected by said detecting means.

2. A document sheet recognition device according to claim 1, wherein said detecting means includes a plurality of light quantity detecting elements arranged in positional relationship with the respective fixed area and converging means for converging light from the respective fixed areas to supply that light to the corresponding light quantity detecting elements.

3. A document sheet recognition device according to claim 1, wherein said discriminating means discriminates a size of the document sheet on the basis of the sum of the average light quantities between the fixed areas.

4. A document sheet recognition device according to claim 1, wherein said document sheet is exposure-scanned by said light source, each said fixed area is a line area which is located in the vertical direction to a scanning direction, and said discriminating means discriminates a width of a document sheet on the basis of a peak level of the average light quantity during an exposure-scanning of the document sheet.

5. A document sheet recognition device according to claim 1, wherein said document sheet is exposure-scanned by moving said document sheet table.

6. A document sheet recognition device according to claim 1, wherein said document sheet is exposure-scanned by moving said light source.

7. A document sheet recognition device comprising:
   a document sheet table for mounting a document sheet thereon;
   a light source for illuminating the document sheet mounted on said document sheet table;
   at least two detecting means each for detecting an average light quantity of each of fixed areas on said document sheet table; and
   discriminating means for discriminating a size and a center position of the document sheet on said document sheet table on the basis of the sum and the difference between the average quantities detected by said detecting means, respectively, and for recognizing a position of the document sheet on said document sheet table on the basis of the thus discriminated size and center position of the document sheet.

8. A document sheet recognition device according to claim 1, wherein said light quantity detecting means includes means for detecting an average light quantity of a reference area, said reference area being one of said fixed areas, and wherein said discriminating means performs discrimination operation thereof on the basis of the average light quantity of said reference area and the average light quantity of each said fixed area.

9. A document sheet recognition device according to claim 7, wherein said detecting means includes a plurality of light quantity detecting elements arranged in positional relationship with the respective fixed areas and converging means for converging light from the respective fixed areas to supply that light to the corresponding light quantity detecting elements.

10. a document sheet recognition device according to claim 7, wherein said document sheet is exposure-scanned by said light source, each said fixed area is a line area which is located in the vertical direction to a scanning direction, and said discriminating means discriminates a width of a document sheet on the basis of a peak level of the average light quantity during an exposure-scanning of the document sheet.

11. A document sheet recognition device according to claim 7, wherein said document sheet is exposure-scanned by moving said document sheet table.

12. A document sheet recognition device according to claim 7, wherein said document sheet is exposure-scanned by moving said light source.

* * * * *

UNITED STATES PATENT AND TRADEMARK OFFICE
CERTIFICATE OF CORRECTION

PATENT NO. : 4,698,511

DATED : October 6, 1987

INVENTOR(S) : TETSUO SUEDA, ET AL.

It is certified that error appears in the above-identified patent and that said Letters Patent is hereby corrected as shown below:

COLUMN 3

Line 4, "invention." should read --invention,--.
    Line 15, "invention." should read --invention,--.
    Line 24, "of" should read --for--.

COLUMN 4

Line 9, "determined" should read --determined,--.
    Line 21, "signals" should read --values--.
    Line 22, "values 1." should read --signal 1.--.

COLUMN 7

Line 3, "$D_X$," should read --$D_X$,--.
    Line 52, "area" should read --areas--.

UNITED STATES PATENT AND TRADEMARK OFFICE
CERTIFICATE OF CORRECTION

PATENT NO. : 4,698,511

DATED : October 6, 1987

INVENTOR(S) : TETSUO SUEDA, ET AL.

It is certified that error appears in the above-identified patent and that said Letters Patent is hereby corrected as shown below:

COLUMN 8

Line 47, "a" should read --A--.

Signed and Sealed this

Twenty-first Day of June, 1988

Attest:

DONALD J. QUIGG

Attesting Officer

Commissioner of Patents and Trademarks